United States Patent [19]
Ohira et al.

[11] Patent Number: 4,860,055
[45] Date of Patent: Aug. 22, 1989

[54] IMAGE FORMING APPARATUS CAPABLE OF DISPLAYING CAPACITY AND/OR REMAINING QUANTITY OF SHEETS OF PAPER

[75] Inventors: Tadashi Ohira, Toyokawa; Masazumi Ito, Toyohashi; Syuzi Maruta, Toyokawa, all of Japan

[73] Assignee: Minolta Camera Kabushiki Kaisha, Osaka, Japan

[21] Appl. No.: 174,389

[22] Filed: Mar. 28, 1988

Related U.S. Application Data

[63] Continuation-in-part of Ser. No. 52,729, May 20, 1987, Pat. No. 4,748,479.

[30] Foreign Application Priority Data

May 28, 1986 [JP] Japan ............................... 61-122534

[51] Int. Cl.⁴ ............................................. G03B 27/58

[52] U.S. Cl. ...................................... 355/308; 355/72; 355/209; 355/313

[58] Field of Search ........... 355/14 R, 14 SH, 14 CU, 355/3 SH, 72

[56] References Cited

U.S. PATENT DOCUMENTS

| | | | |
|---|---|---|---|
| 4,273,323 | 6/1981 | Kaneko et al. | 271/157 |
| 4,436,406 | 3/1984 | Murasaki et al. | 355/3 SH |
| 4,500,199 | 2/1985 | Kasuga et al. | 355/14 CU |
| 4,535,463 | 8/1985 | Ito et al. | 355/14 CU X |
| 4,566,547 | 1/1986 | Furvkawa | 355/14 SH X |
| 4,688,929 | 8/1987 | Taniguchi et al. | 355/14 SH X |
| 4,724,460 | 2/1988 | Shinyashiki | 355/14 CU X |
| 4,734,747 | 3/1988 | Okuda et al. | 355/14 CU X |
| 4,748,479 | 5/1988 | Ohira et al. | 355/14 SH X |

*Primary Examiner*—Richard A. Wintercorn
*Attorney, Agent, or Firm*—Price, Gess & Ubell

[57] ABSTRACT

A copying apparatus comprises at least one sheet storing tray, at least one detector for detecting a quantity of sheets of paper in a tray, and an indicator. The indicator can display a capacity of a tray selected for copy operation and can also display a remaining quantity of sheets in that tray in response to the detector.

26 Claims, 10 Drawing Sheets

IMAGE FORMING APPARATUS CAPABLE OF DISPLAYING CAPACITY AND/OR REMAINING QUANTITY OF SHEETS OF PAPER

RELATED APPLICATION

This is a continuation-in-part application of Ser. No. 052,729 filed on May 20, 1987, now U.S. Pat. No. 4,748,479, issued May 31, 1988.

BACKGROUND OF THE INVENTION

1. Field of the Invention

The present invention relates to an image forming apparatus and particularly to an image forming apparatus capable of displaying a capacity for storing sheets of paper to be printed and/or a remaining quantity of such sheets.

2. Description of the Prior Art

These days, apparatus for forming an image on paper based on prescribed information, such as copying machines, printers, and facsimiles are available.

In such an image forming apparatus, sheets of paper such as copying paper are stored in prescribed different containers (paper storing means) according to the sizes for example and a user selects a suitable size of paper or a suitable container as required so that an image may be formed on the paper.

At that time of forming an image by the above stated apparatus, the user sometimes wants to have information as to a remaining quantity of sheets in a specified container, a sheet storing capacity of that container or a quantity of sheets to be replenished in the container.

For example, at the time of copying a large number of sheets of paper, if the remaining quantity of sheets is known, it serves to determined whether sheets of paper should be replenished before the copy operation. In addition, based on the sheet storage capacity and the remaining quantity of sheets, the number of sheets to be replenished can be determined. Further, if a plurality of containers for storing sheets of paper of the same size are placed, information as to the number of sheets to be copied, the remaining quantity of sheets and the sheet storing capacity serves to determine what container is to be selected.

Such information is conveniently obtained, for example, when the user watches the sheets in the container. However, it is difficult to precisely ascertain visually the remaining quantity of sheets and the capacity of the container. In addition, if the container is placed in a position which can not easily be in sight, it is troublesome to obtain such information.

Under the circumstances, copying machines each comprising a single storing means for storing sheets of paper, means for detecting a remaining quantity of sheets in the storing means and display means for displaying the remaining quantity of sheets in response to the detecting means have been proposed recently and the U.S. Pat. Nos. 4,535,463 and 4,273,323 disclose such copying machines. However, neither of the United States patents teaches a technical thought that an image forming apparatus comprising sheet storage means is capable of displaying a capacity of the storage means.

SUMMARY OF THE INVENTION

The present invention has been made in view of the above described prior art techniques and it is an object of the present invention to provide an image forming apparatus which comprises sheet storing means and is capable of automatically displaying a capacity of the storing means.

Another object of the present invention is to provide an image forming apparatus which comprises a plurality of sheet storing means and is capable of automatically displaying a remaining quantity of sheets in a selected storing means.

A further object of the present invention is to provided an image forming apparatus which comprises sheet storing means and is capable of automatically displaying both the capacity of the storing means and the remaining quantity of sheets in that storing means.

According to an aspect of the present invention, an image forming apparatus comprises: a frame box; image forming means provided inside the frame box; first paper feed means provided inside the frame box; second paper feed means provided outside the frame box; means for detecting a quantity of sheets of paper stored in the first paper feed means; display means for displaying the quantity of sheets in the first paper feed means in response to the detecting means; means for selecting a first paper feed mode for sending out sheets of paper from the first paper feed means or a second paper feed mode for sending out sheets of paper from the second paper feed means; and control means for enabling operation of the display means during the first paper feed mode and disabling operation of the display means during the second paper feed mode.

According to another aspect of the present invention, an image forming apparatus comprises: a frame box; image forming means provided inside the frame box; first paper feed means provided inside the frame box; second paper feed means provided outside the frame box; display means for displaying a capacity of the first paper feed means; means for selecting a first paper feed mode for sending out sheets of paper from the first paper feed means or a second paper feed mode for sending out sheets of paper from the second paper feed means; and control means for enabling operation of the display means during the first paper feed mode and disabling operation of the display means during the second paper feed mode.

According to a further aspect of the present invention, an image forming apparatus comprises: image forming means; first paper feed means; second paper feed means; means for detecting a quantity of sheets of paper stored in the first paper feed means; display means for displaying the quantity of sheets in the first paper feed means in response to the detecting means; means for selecting a first paper feed mode for sending out sheets of paper from the first paper feed means or a second paper feed mode for sending out sheets of paper from the second paper feed means; and control means for enabling operation of the display means during the first paper feed mode and disabling operation of the display means during the second feed mode.

According to a still further aspect of the present invention, an image forming apparatus comprises: image forming means; first paper feed means; second paper feed means; display means for displaying a capacity of the first paper feed means; means for selecting a first paper feed mode for sending out sheets of paper from the first paper feed means or a second paper feed mode for sending out sheets of paper from the second paper feed means; and control means for enabling operation of the display means during the first paper feed mode and disabling operation of the display means during the second paper feed mode.

According to a still further aspect of the present invention, an image forming apparatus comprises: image forming means; paper feed means; means for detecting a quantity of sheets of paper stored in the paper feed means; display means for displaying the quantity of sheets in the paper feed means in response to the detecting means; and switch means for switching operation and inoperation modes of the display means.

According to a still further aspect of the present invention, an image forming apparatus comprises: image forming means; paper feed means; display means for displaying a capacity of the paper feed means; and switch means for switching operation and inoperation modes of the display means.

According to a still further aspect of the present invention, a paper feeding device used in an image forming apparatus, comprises: means for storing sheets of paper; means for sending out sheets of paper one by one from said storing means; and display means for displaying a capacity of the storing means.

According to a still further aspect of the present invention, a paper feeding device used in an image forming apparatus, comprises: means for storing sheets of paper capacities; means for detecting a quantity of sheets of paper in said storing means; means for sending out sheets of paper one by one from said storing means; and display means including a first display portion for displaying a capacity of the storing means and a second display portion for displaying a quantity of sheets of paper in the storing means in response to the detecting means.

According to a still further aspect of the present invention, an image forming apparatus comprises: image forming means; first paper feed means including means for storing sheets of paper, means for sending out sheets of paper one by one from the storing means to the image forming means, means for displaying a capacity of the storing means; second paper feed means including temporary storing means for temporarily storing the sheets printed by the image forming means, and means for sending out sheets of paper one by one from the temporary storing means to feed again the sheets to the image forming means; means for selecting either a first paper feed mode for feeding sheets of paper from the first paper feed means to the image forming means or a second paper feed mode for feeding sheets of paper from the second paper feed means to the image forming means; and means for forbidding display of the means for displaying the capacity during the second paper feed mode.

According to a still further aspect of the present invention, an image forming apparatus comprises: image forming means; first paper feed means including means for storing sheets of paper, means for detecting a quantity of sheets of paper in the storing means, means for sending out sheets of paper one by one from the storing means to the image forming means, and second paper feed including temporary storing means for temporarily storing sheets of paper printed by the image forming means, and means for second out sheets of paper one by one from the temporary storing means to feed again the sheets to the image forming means; means for selecting either a first paper feed mode for feeding sheets of paper from the first paper feed means to the image forming means or a second paper feed mode for feeding sheets of paper from the second paper feed means to the image forming means; and display means for displaying a quantity of sheets of paper in the storing means in the first paper feed mode in response to the detecting means, and displaying predetermined information in the second paper feed mode irrespective of the quantity of sheets of paper in the storing means.

Therefore, according to an image forming apparatus of the present invention, users can readily get information about a quantity of sheets to be printed and a maximum capacity of sheets to be stored. More specifically, users can readily get information about the quantity of sheets to be supplied even if a sheet storing portion is placed in a portion which can not easily be seen by the users.

In addition, if a large quantity of sheets are to be printed, a storing portion containing suitable sheets can be easily selected. For example, if sheets of copy paper of the same size are contained in paper feed cassettes and elevator-type storing portions, a suitable storing portion containing a sufficient number of sheets can be easily selected by examining the remaining quantities and the capacities of sheets in the respective storing portions.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
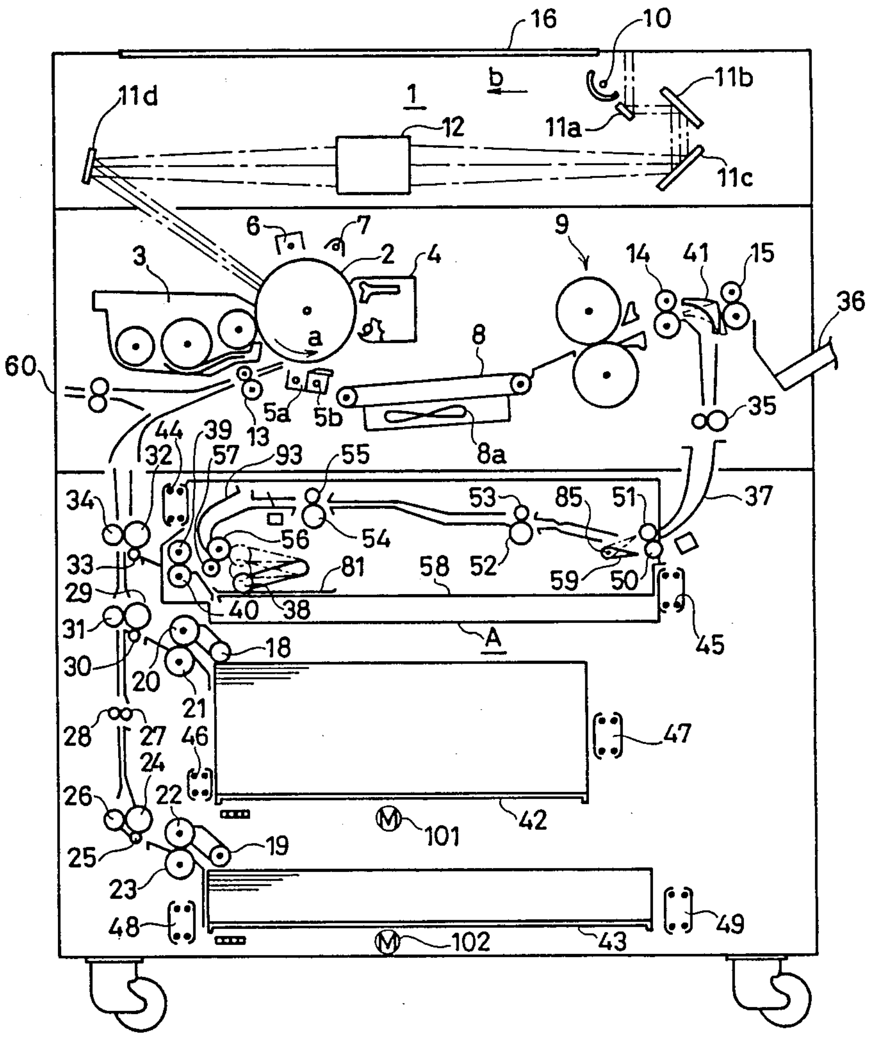
FIG. 1A is a typical view showing an outline of a mechanism of a copying apparatus according to an embodiment of the present invention.

A copying apparatus in accordance with an embodiment of the present invention will be described in the following with reference to the attached drawings.

First, referring to FIG. 1, construction and operation of this copying apparatus will be described. This copying apparatus comprises: copy paper storing portions 42 and 43, a paper feed portion and an intermediate tray unit A in a lower portion thereof; an image forming portion including a photosensitive drum 2 as a center in an intermediate portion thereof; and an optical system 1 in an upper portion thereof. When a sheet of copy paper onto which a copy operation has been effected is fed again to the intermediate tray unit A, duplex copy (namely, copy of both surfaces of a sheet) or composite copy can be effected.

The photoconductive drum 2 is rotatable in a direction of the arrow a and, around the photoconductive drum 2, there are provided a sensitizing charger 6, a developing unit 3 of a magnetic brush type, a transfer charger 5*a*, a separation charger 5*b*, a cleaner 4 of a blade type, and an eraser lamp 7. When the photoconductive drum 2 rotates in the direction of the arrow a, it is uniformly sensitized by the sensitizing charger 6 and undergoes an exposure from the optical system 1 so that a latent electrostatic image is formed. This latent electrostatic image is developed by the developing unit 3 so that a toner image is obtained.

The optical system 1 is capable of scanning a document in a direction of the arrow b under a document glass table 16. The optical system 1 comprises an exposure lamp 10, movable mirrors 11*a*, 11*b* and 11*c*, a lens 12 and a fixed mirrors 11*d*. The exposure lamp 10 and the movable mirror 11*a* move together in the direction of the arrow b at a speed V/m (m: a copying magnification) with respect to a rotation speed V of the photoconductive drum 2 (constant irrespective of whether an equal-scale magnification of a variable-scale magnification is selected), and the movable mirrors 11*b* and 11*c* move together in the direction of the arrow b at a speed V/2m.

On the other hand, the copy paper storing portions comprises the upper elevator-type storing portion 42 and the lower elevator-type storing portion 43. The storing portion 42 and 43 are driven by an upper paper feed elevator lift-up motor 101 and a lower paper feed elevator lift-up motor 102, respectively, so that sheets of copy paper contained therein are pushed upward when the sheets of copy paper are being fed. An amount of such upward movement of the sheets of copy paper is detected as the number of revolutions of the motor 101 or 102 by a disc (not shown) connected to the motor 101 or 102 so that it is inputted to a first microprocessing unit (referred to hereinafter as MPU) 621 to be described later. The storing portions 42 and 43 can be taken out in a direction from the main body of the copying apparatus to the front face thereof by means of rails 46 and 47, and rails 48 and 49, respectively.

There is further provided a manual paper feed inlet 60, into which sheets of copy paper other than those for the storing portions 42 and 43 can be manually inserted.

Figure 1B:
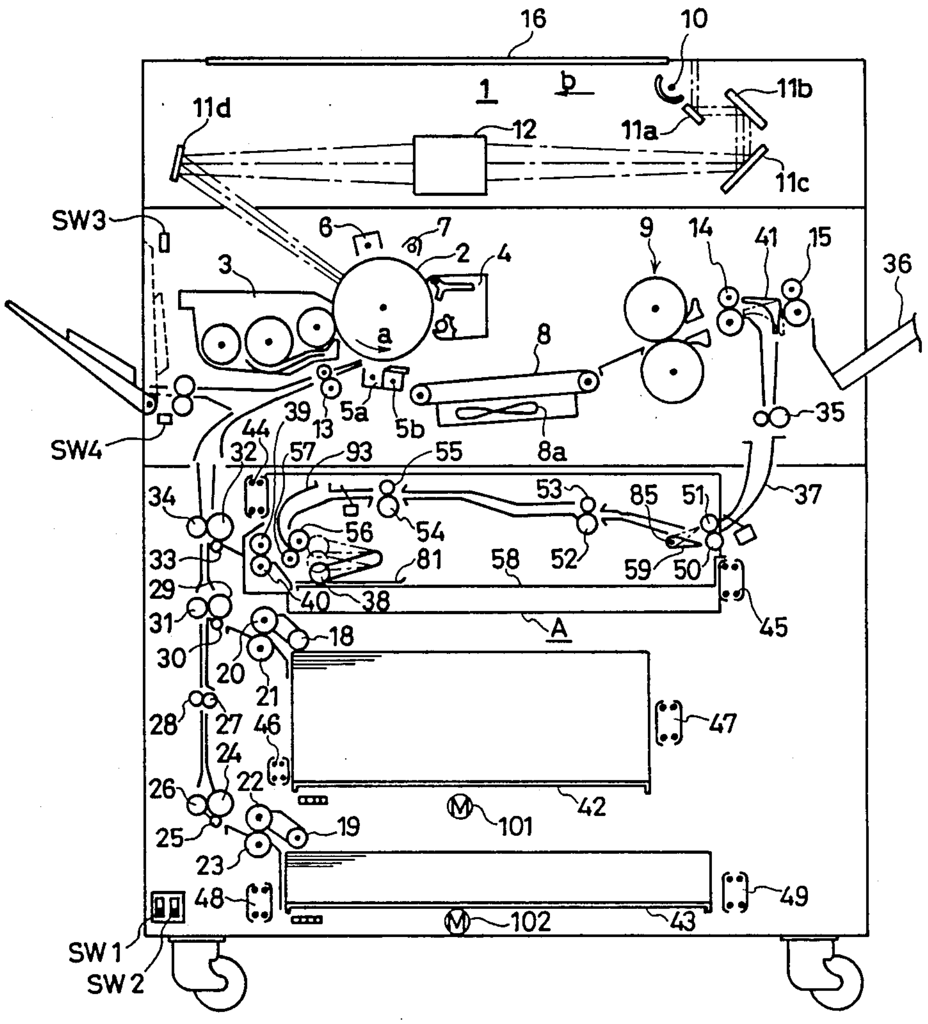
FIG. 1B is similar to FIG. 1A, except that some portions are modified.

Referring to FIG. 1B, a table 63 for supporting a sheet of paper is provided at the manual paper feed inlet 60. The table 63 can be opened and shut. When the table 63 is opened, a switch 3 detects the opening of the table 63 and then the manual paper feed mode is selected. When a sheet of paper is inserted into the manual paper feed inlet 60, a switch SW4 detects the insertion of the sheets and then the image forming operation is started.

In addition, a large-capacity paper feed device of such a type as disclosed in the U.S. Pat. No. 4,436,406 can be attached to the paper feed inlet 60.

Figure 1C:
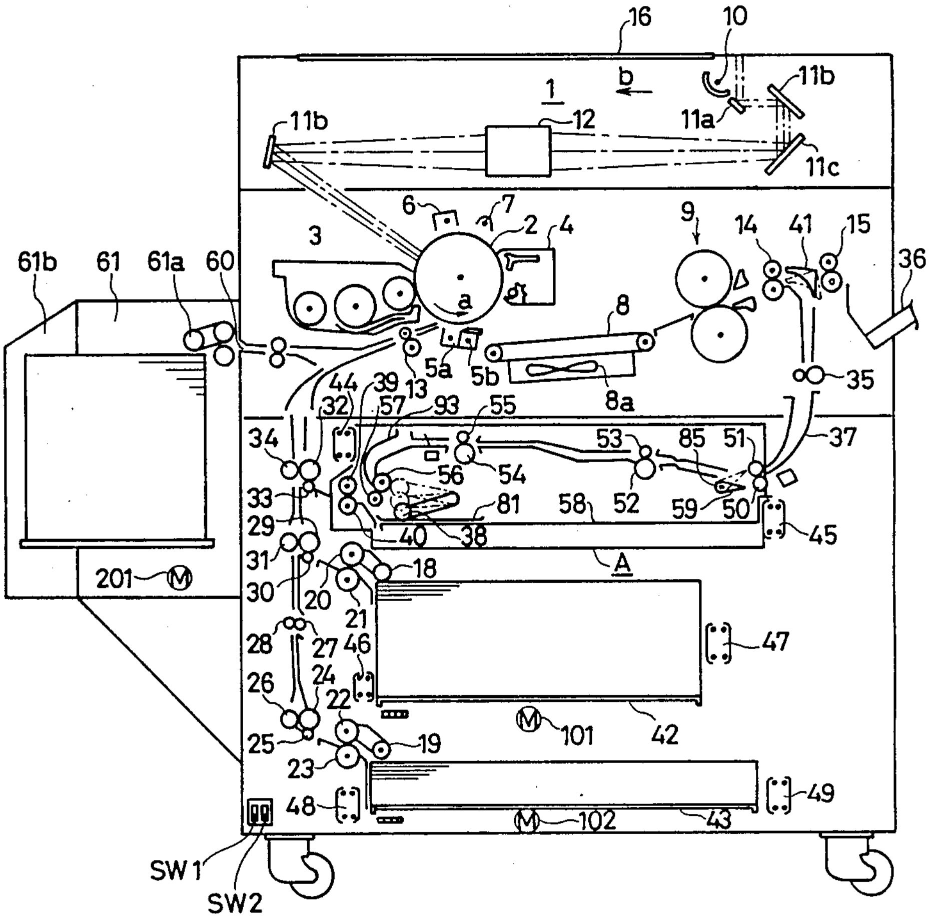
FIG. 1C is also similar to FIG. 1A, except that some portions are modified.
Figure 1D:
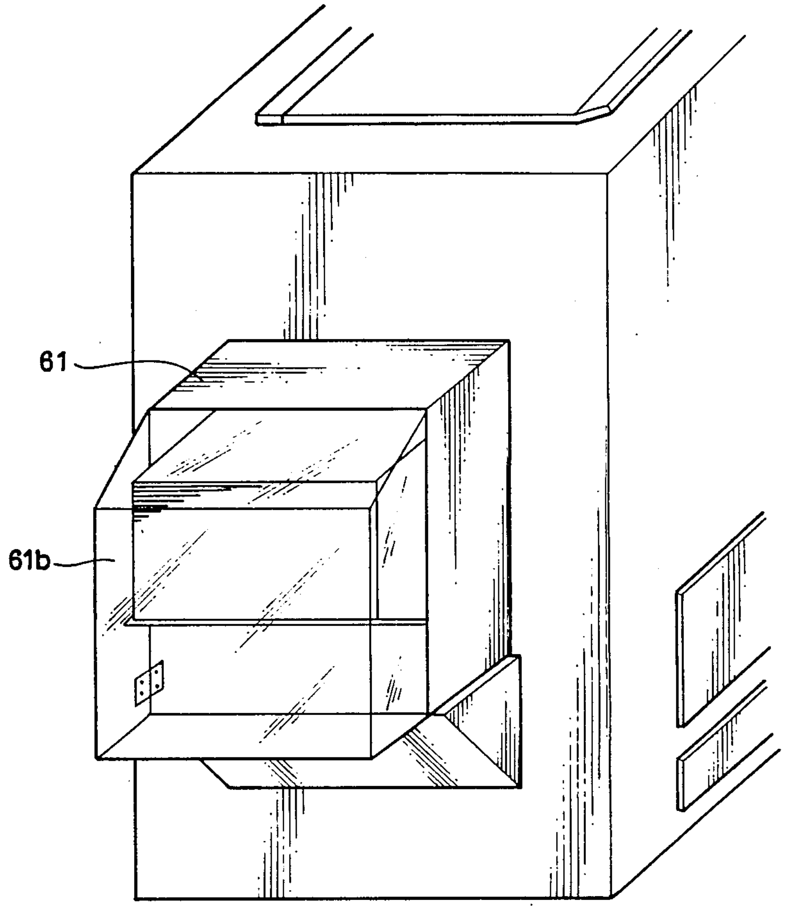
FIG. 1D is a partial perspective outside view of the apparatus of FIG. 1C.

Referring to FIGS. 1C and 1D, a large-capacity paper feed device 61 is attached to the paper feed inlet 60. The device 61 includes an elevator lift-up motor 201 and a roller 61*a* for automatically inserting sheets of paper one by one into the paper feed inlet 60. The device 61 also has a transparent cover 61*b* and thus a quantity of sheets of paper stored in the device 61 can be detected visually from the outside.

Either the sheets of copy paper in the storing portion 42 or the sheets of copy paper in the storing portion 43 are delivered one by one selectively through delivery rollers 20 and 21 or delivery rollers 22 and 23 by rotation of a paper feed roller 18 or a paper feed roller 19 so as to be transported timing rollers 13 through transport rollers 29, 30 and 31, and rollers 32 and 34 (in the case of the sheets in the storing portion 42) or through transport rollers 24, 25 and 26, and rollers 27 and 28 (in the case of the sheets in the storing portion 43).

The transported sheet is temporarily stopped by the timing rollers 13 and then it is sent out to a transfer portion in synchronism with the image formed on the photoconductive drum 2. Consequently, the above mentioned toner image is transferred onto the sheet by discharge of the transfer charger 5*a* and the sheet is separated from the surface of the photoconductive drum 2 by discharge of the separation charger 5*b*. Then, the sheet is transported to a fixing device 9 by means of a transport belt 8 comprising an air suction means 8*a* so that a fusing and fixing process is applied to the toner image.

A lever 41 for selecting a transport path of the copy paper is provided between transport rollers 14 adjacent to an outlet of the fixing device 9 and outlet rollers 15. In the sheet is to be readily discharged, the lever 41 is set in a position as shown by the chained lines in FIG. 1 so that the sheet sent out from the fixing device 9 is discharged from the outlet rollers 15 onto a tray 36. In the case of duplex copy or composite copy (to be described in detail afterwards), the lever 41 is set in a position shown by the solid lines so that the sheet is sent from transport rollers 35 through a guide plate 37 into the intermediate tray unit A to be described below in detail.

On the other hand, the cleaner 4 removes the remaining toner from the photoconductive drum 2 after the transfer and the remaining electric charge is removed by applying light from the eraser lamp 7 to the drum 2 so that the drum 2 is prepared for the subsequent copy operation.

New, an outline of construction of the intermediate tray unit A will be described.

The intermediate tray unit A is formed as a unitary body comprising a selection block, a transfer block, a reverse block, an intermediate tray block and a re-feed block. Both ends of the unit A are supported by the rails 44 and 45. This unit A can be taken out from the main body of the copying apparatus in the direction of the front face, namely, in a direction perpendicular to a paper feeding direction.

The selection block has transport rollers 50 and 51, and a selection lever 59. The selection block may be provided in the main body of the copying apparatus not in the intermediate tray unit A.

The transport block comprises transport rollers 52, 53, 54 and 55, a guide plate.

The reverse block comprises a reverse transfer rollers 56 and 57, and a reverse guide 93. This reverse block reverses the moving direction of the copy paper transported by the transport block to send it onto an intermediate tray 58.

The re-feed block comprises a holder, rollers 38, 39 and 40, and a guide plate. This re-feed block feeds again the sheets of copy paper on the intermediate tray 58 one by one for copy operation.

For the purpose of performing duplex copy of composite copy, either a mode selection key 303 or a mode selection key 304 on an operation panel 300 (shown in FIG. 2) is pressed to select either copy mode. Then, the selection lever 41 moves to be in the position shown by the solid lines in FIG. 1 so that the sheet of copy paper having one face or a portion already printed is transported by the guide plate 37 from the transport rollers 35 to the transport rollers 50 and 51.

In the duplex copy mode, the selection lever 59 rotatable around an axis 85 is set in a position shown by the solid lines in FIG. 1. As a result, the sheet of copy paper is moved over the upper surface of the lever 59 and sent to the transfer block and it is guided by the guide plate and transported to the left in FIG. 1 by the transport rollers 52, 53, 54 and 55. Then, it is turned by the reverse transport rollers 56 and 57, and the reverse guide 93 so that it is sent onto the intermediate tray 58 with the face already printed being directed upward. Then, the sheets thus transported are set in order so as to be fed again one by one by clockwise rotation of the refeed roller 38.

On the other hand, in the composite copy mode, the selection lever 59 is set in a position shown by the chained lines in FIG. 1 so that the sheet of copy paper introduced by the transport rollers 50 and 51 is immediately guided along the lower surface of the lever 59 and is sent directly onto the intermediate tray 58 with the face already printed being directed downward. Then, in the same manner as in the duplex copy mode, the sheets of copy paper thus sent are fed again one by one by clockwise rotation of the re-feed roller 38.

The sheets of copy paper to be fed again are delivered through the delivery rollers 39 and 40 and transported to the timing rollers 13 through the transport rollers 32, 33 and 34, so that duplex copy or composite copy is applied to the sheets in the same manner as in the standard copy process. The re-feed roller 38 can be positioned at three levels (as shown by the chained lines, the dotted lines and the solid lines in FIG. 1). When the sheets of copy paper are sent onto the intermediate tray 58, the roller 38 is positioned at the upper or intermediate level and when the sheets of copy paper are fed again, it is positioned at the lowest level so as to press the sheets on the intermediate tray 58 by a suitable pressure.

Figure 2:
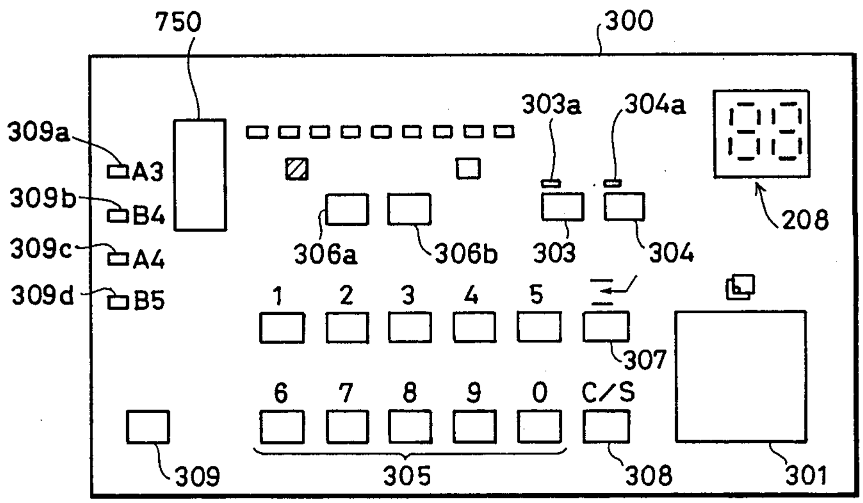
FIG. 2 is an illustration of an operation panel of the copying apparatus.

FIG. 2 is an illustration showing a portion of the operation panel of the copying apparatus.

This operation panel comprises a print key 301, a paper selection key 309 with display elements 309*a* to 309*d*, a numerical value input ten key 305, an interruption key 307, a clear stop key 308, density setting keys 306*a* and 306*b*, a duplex mode key 303 with a display element 303*a*, a composite mode key 304 with a display element 304*a*, a numerical value display portion 208, and a display portion 750 for displaying a remaining quantity and a capacity of sheets of copy paper and the like.

Figure 3:
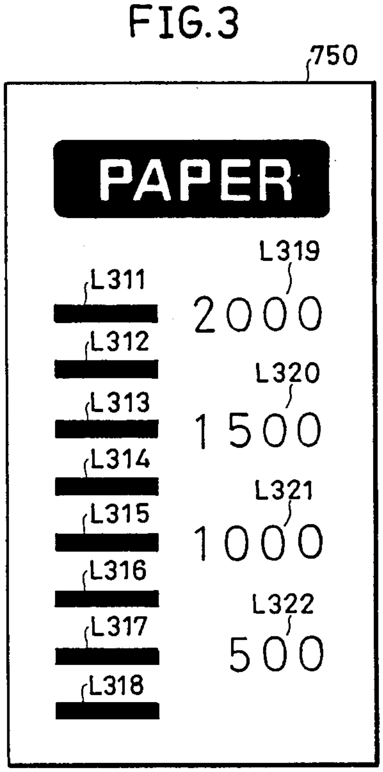
FIG. 3 is an enlarged and detailed illustration showing a display portion (for displaying a remaining quantity and a capacity) shown in FIG. 2.

FIG. 3 is an enlarged view of the above mentioned display portion 750 for displaying a remaining quantity and a capacity of sheets of copy paper.

In FIG. 3, L311 to L318 are light emitting diodes (referred to hereinafter as LEDs) for displaying each a remaining quantity corresponding to 250 sheets of copy paper. Those LEDs are turned off successively in the order starting from the uppermost one in the figure as the quantity of sheets decreases. More specifically, if the number of remaining sheets is 250, only L318 is turned on and if the number of remaining sheets is 1500, L313 to L318 are turned on.

The numerals 500, 100, 1500 and 2000 each represent a capacity of a copy paper storing portion connected to the paper feed inlet. LEDs L319 to L322 are provided at the back of those numerals, respectively.

However, when a switch SW1 as shown in FIGS. 1B and 1C is turned off, any of the LEDs L311 to L318 is never activated. Similarly, when a switch SW2 as shown in FIGS. 1B and 1C is turned off, any of the LEDs L319 to L322 is never activated.

Figure 4:
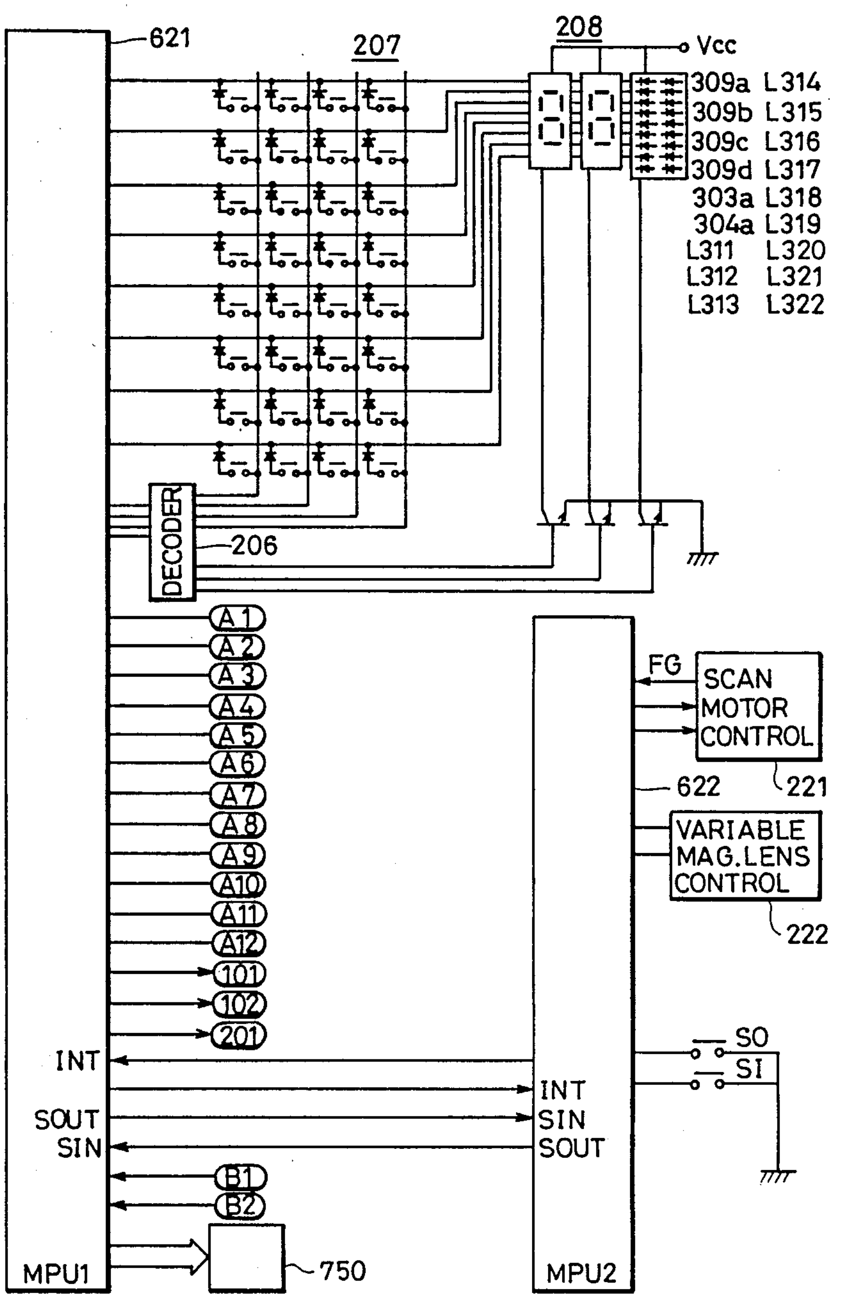
FIG. 4 is a circuit diagram showing an electrical circuit configuration of the apparatus of the embodiment.

In the following, a control circuit of this copying apparatus will be described with reference to FIG. 4.

This control circuit mainly comprises a first microprocessing unit (MPU) 621 for control of copy operation and a second MPU 622 for control of the optical system. The first MPU 621 is connected with a switch matrix 207 where the operation keys on the operation panel 300 and sensors are arranged.

Output terminals A1 to A12 of the first MPU 621 are connected with a main motor, development motor, a feed clutch, a re-feed clutch, solenoids for selection of the levers 41 and 59, etc. Those components are turned on and off by control based on signals from the above mentioned switch matrix 207. Output terminals 101 and 102 of the first MPU 621 are connected with the elevator drive motors for the upper and lower storing portions 42 and 43. Similarly, an output terminal 201 of the MPU 621 is to be connected with the elevator drive motor of the large-capacity paper feed device 61. Input terminals B1 and B2 of the first MPU 621 received pulses generated by rotation of the elevator drive motors of the upper and lower storing portions 42 and 43, respectively, so that the remaining quantity of sheets of copy paper is determined by the count value of the pulses so as to be outputted to the display portion 750. The first MPU 621 is further connected with various LEDs for the display portion 208 etc. through a decoder 206 so as to control turning on and off of those LEDs.

On the other hand, the second MPU 622 is connected with a drive control portion 221 for a DC motor for scanning of the optical system, a drive control portion 222 for stepping motor for movement of the lens, a fixed position switch S0 of the optical system 1, a timing switch S1 etc.

Now, operation of the apparatus of this embodiment will be described.

Figure 5:
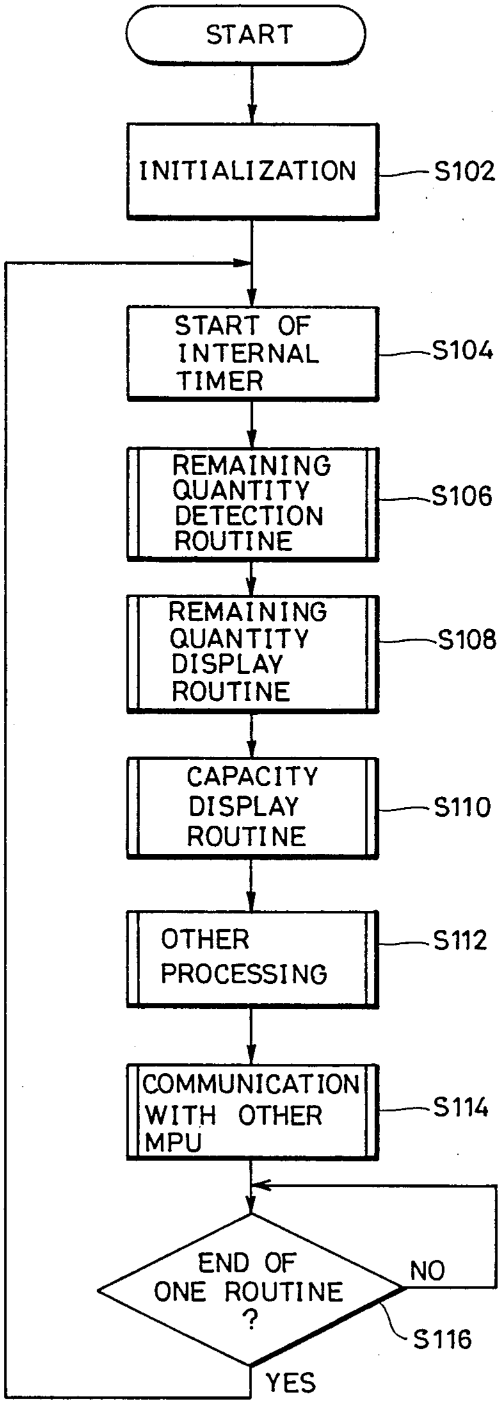
FIG. 5 is a flow chart showing a main routine of a first microprocessing unit of the apparatus of the embodiment.

FIG. 5 is a flow chart showing a main routine of the first MPU 621 in the apparatus of this embodiment.

First, initialization is performed in the step A102. For example, a RAM, flags and the like are initialized and the copy mode is set to the standard mode.

Then, in the step S104, an internal timer for defining a length of time for one routine is set. Then, procedures in the steps S106 to S114 are executed. After that, there is a wait for an end of the internal timer set in the step S104 and then the routine returns to the step S104.

The step S106 is related with processing for detecting a remaining quantity of sheets. This step will be described in detail with reference to FIG. 6.

The step S108 is related with processing for displaying, in the display portion 750 of the operation panel, the remaining quantity of sheets obtained in the step S106. This step S108 will be described in detail with reference to FIG. 7.

The step S110 is related with processing for displaying the capacity of the storing portion 42 or 43 connected to the paper feed inlet. This step S110 will be described in detail with reference to FIG. 8.

The step S112 is related with subroutines for executing processing necessary for control of the copying apparatus, such as processing for receiving inputs through the keys and the sensors, processing for displaying various data, processing for copy operation or control processing for regulation of temperature. Since those processing subroutines are well known, description thereof is omitted.

The step S114 is a subroutine for executing communication with MPUs other than the above described first MPU provided in the copying apparatus, namely, the second MPU 622 for controlling the optical system, a MPU for controlling a duplex unit not shown, etc. This subroutine is well known and therefore description thereof is omitted.

Figure 6:
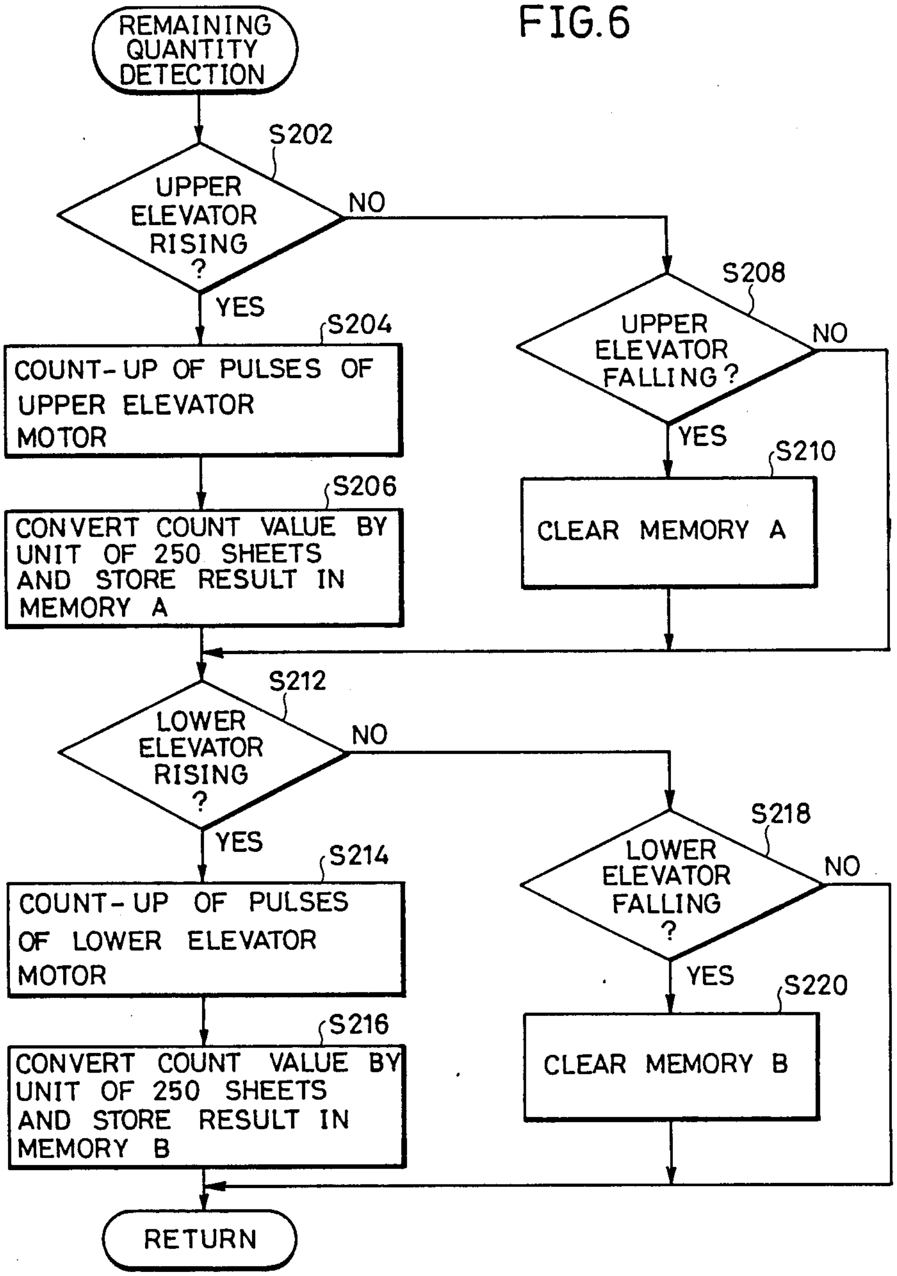
FIG. 6 is a flow chart showing the details of the step S106 in FIG. 5.

FIG. 6 is a flow chart for explaining the details of the step S106.

First, it is determined in the step S202 whether the paper feed elevator of the upper storing portion 42 is rising or not. If it is determined that the upper storing portion 42 is rising, the routine proceeds to the step S204 to count the number of pulses transferred from the disc corresponding to the raised level of the upper paper feed elevator. The count value is stored in a memory A with the number of pulses corresponding to 250 sheets of copy paper being regarded as a unit (in the step S206). Thus, the remaining quantity of sheets of copy paper is evaluated.

If it is determined in the above mentioned step S202 that the upper feed elevator is not rising, the routine proceeds to the step S208 to determine whether the upper paper feed elevator is falling or not. If it is falling, the routine proceeds to the step S210 to clear the content of the memory A, that is, the remaining quantity of sheets in the upper storing portion 42. If it is determined in the step S208 that the upper feed elevator is not falling, the routine proceeds to the step S212.

The steps S212 to S220 are related with processing for detecting the remaining quantity of sheets in the lower storing portion 43, which processing is performed in the same manner as the processing in the above described steps S202 to S210.

Figure 7:
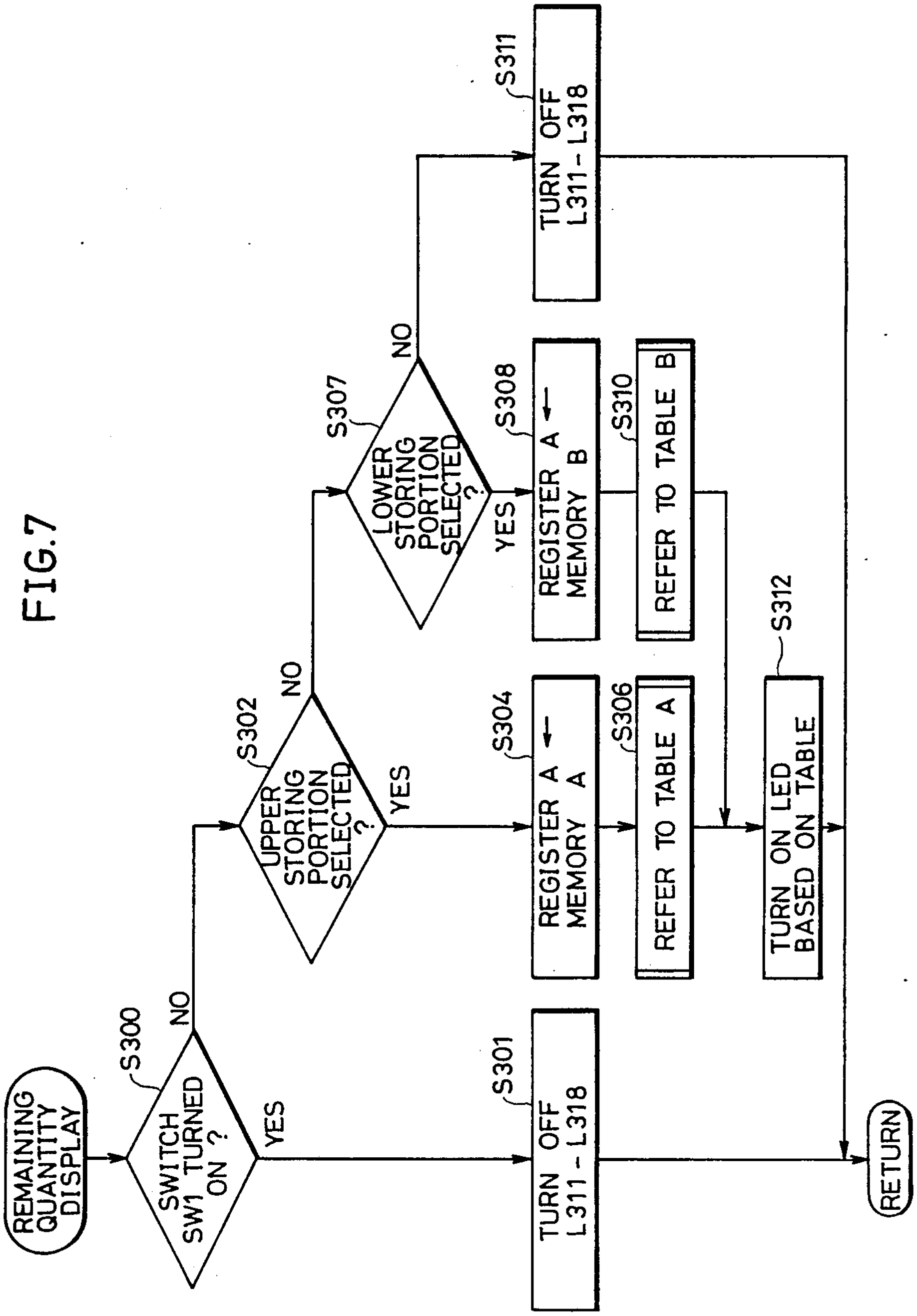
FIG. 7 is a flow chart showing the details of the step S108 in FIG. 5.

FIG. 7 is a flow chart showing the details of the above described step S108.

First, it is determined in the step S300 whether the switch SW1 is turned on or not. When the switch is not turned on, all the LEDs L311 to L318 are turned off in the step S301.

When the switch SW1 is turned on, it is determined in the step S302 whether the upper storing portion 42 is selected or not. If it is selected, the routine proceeds to the step S304 to call the content (the remaining quantity of sheets) in the memory A to an accumulator of the first MPU 621. Then, in the step S306, reference is made to Table A (for designating any of the LEDs to be turned on corresponding to the thus called value) so that the specified LEDs are turned on in the step S312 based on the result of the reference.

TABLE A

| | Register A | | | | | | |
|---|---|---|---|---|---|---|---|
| LED | 0 | 1 | 2 | 3 | 4 | 5 | 6 |
| 311 | — | — | — | — | — | — | — |
| 312 | — | — | — | — | — | — | — |
| 313 | O | — | — | — | — | — | — |
| 314 | O | O | — | — | — | — | — |

TABLE A-continued

| | Register A | | | | | | |
|---|---|---|---|---|---|---|---|
| LED | 0 | 1 | 2 | 3 | 4 | 5 | 6 |
| 315 | O | O | O | — | — | — | — |
| 316 | O | O | O | O | — | — | — |
| 317 | O | O | O | O | O | — | — |
| 318 | O | O | O | O | O | O | — |

: ON —: OFF

When the upper storing portion 42 is not selected, it is determined in the step S302 whether the lower storing portion 43 is selected or not. If it is selected, reference is made to Table B through the step S308 and S310 to turn on specified LEDs.

TABLE B

| | Register A | | |
|---|---|---|---|
| LED | 0 | 1 | 2 |
| 311 | — | — | — |
| 312 | — | — | — |
| 313 | — | — | — |
| 314 | — | — | — |
| 315 | — | — | — |
| 316 | — | — | — |
| 317 | O | — | — |
| 318 | O | O | — |

: ON —: OFF

When the lower storing portion 43 is not selected, that is, when the table 63 for manual insertion of sheets or the large-capacity paper feed device 61 is selected, all the LEDs L311 to L318 are turned off in the step S311.

Figure 8:
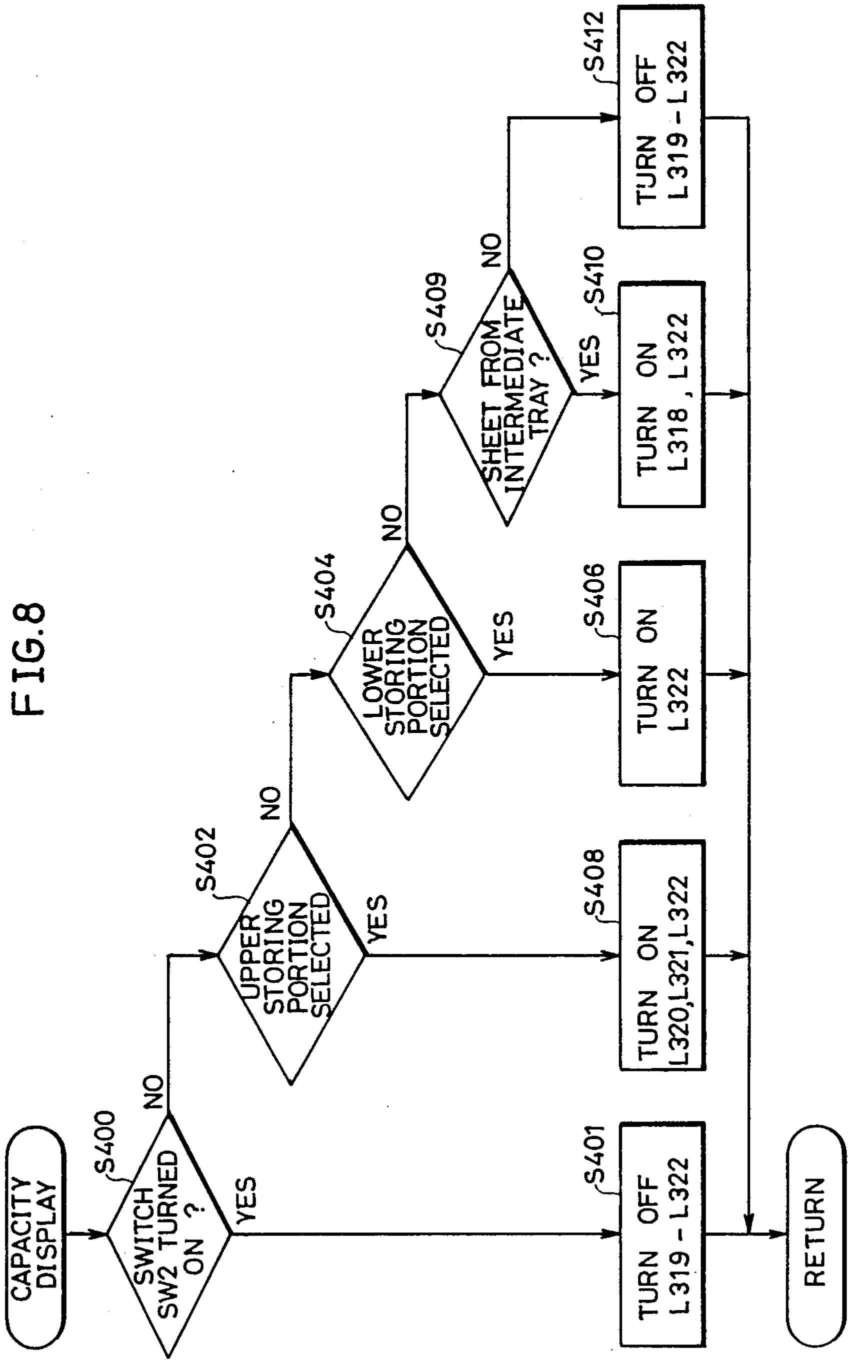
FIG. 8 is a flow chart showing the details of the step S110 in FIG. 5.

FIG. 8 is a flow chart showing the details of the processing in the S110.

First, it is determined in the step S400 whether the switch SW2 is turned on or not. When the switch is not turned on, all the LEDs L319 to L322 are turned off in the step S401.

When the switch SW2 is turned on, it is determined in the step S402 whether the upper storing portion 42 is selected or not. If it is selected, the program proceeds to the step S408 to turn on a specified display LED (L322) corresponding to the capacity of the upper storing portion 42. In this case, the numeral 500 (in FIG. 3) is illuminated.

If it is determined in the step S402 that the upper storing portion 42 is not selected, the program proceeds to the step S404 to determined whether the lower storing portion 43 is selected or not. If it is selected, the program proceeds to the step S406 to turn on specified display LED (L322) corresponding to the capacity of the lower storing portion 43. In this case, the capacity is 1500. Although the numerals 1000 and 500 smaller than the numeral 1500 are also illuminated, this illumination is only made for the purpose of making it easy to read the numerical values of the remaining quantity displayed near this illumination.

When the lower storing portion 43 is not selected, it is determined in the step S409 whether feeding of sheets from the intermediate tray 58 is selected or not. If it is selected, the LEDs L318 and L322 are turned on in the step S410. Thus, in this case, the minimum values of the capacity and the remaining quantity are displayed. Although the LED L318 is turned on irrespective of the remaining quantity of sheets in the intermediate tray 58 when this tray 58 is selected, the display may be made in a variable manner according to the remaining quantity of the intermediate tray 58. In addition, when the intermediate tray 58 is selected, all the LEDs for displaying the capacity and the remaining quantity may be turned off.

When the feeding of sheets from the intermediate tray 58 is not selected, that is, when the table 63 for manual insertion of sheets or the large-capacity paper feed device 61 is selected, all the LEDs L319 to L322 are turned off in the step 412.

As described in the foregoing, the remaining quantity of sheets and the capacity of the storing portion are displayed in the copying apparatus of the embodiment of the present invention.

Although the display of the remaining quantity of sheets is given by a unit of 250 sheets in the above described embodiment, the present invention is not limited thereto. More specifically, the display of the remaining quantity may be made by regarding, as a unit, 100 sheets or 50 sheets, or a further smaller number of sheets. In addition, the remaining quantity may be displayed precisely by a numerical value by counting precisely the number of sheets of copy paper. In this case, it is necessary to provide means for counting the number of sheets of copy paper for example.

In addition, although the above described embodiment is applied to the copying apparatus, the present invention is not limited thereto. The present invention is applicable to any apparatus having means for feeding, from a storing portion, paper onto which an image is reproduced (for example, copy paper). Such apparatus is, for example, a printer, a facsimile or the like.

In addition, although the copying apparatus of the above described embodiment has two storing portions, namely, the upper storing portion 42 and the lower storing portion 43, the present invention is not limited to the apparatus having two storing portions. Furthermore, the present invention is applicable to apparatuses having cassette storing portions or storing externally provided and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
- a frame box;
- image forming means provided inside said frame box;
- first paper feed means provided inside said frame box;
- second paper feed means provided outside said frame box;
- means for detecting a quantity of sheets of paper stored in said first paper feed means;
- display means for displaying the quantity of sheets in said first paper feed means in response to said detecting means;
- means for selecting a first paper feed mode for sending out sheets of paper from said first paper feed means or a second paper feed mode for sending out sheets of paper from said second paper feed means; and
- control means for enabling operation of said display means during said first paper feed mode and disabling operation of said display means during said second paper feed mode.

2. An image forming apparatus in accordance with claim 1, wherein said display means is also capable of displaying a capacity of said first paper feed means.

3. An image forming apparatus in accordance with claim 1, wherein a quantity of sheets of paper stored in said second paper feed means is visually detectable from outside of said frame box.

4. An image forming apparatus in accordance with claim 1, wherein said second paper feed means is supplied with sheets of paper one by one manually.

5. An image forming apparatus in accordance with claim 1, further comprising:
- means for disabling operation of said display means, overriding said control means.

6. An image forming apparatus comprising:
- a frame box;
- image forming means provided inside said frame box;
- first paper feed means provided inside said frame box;
- second paper feed means provided outside said frame box;
- display means for displaying a capacity of said first paper feed means;
- means for selecting a first paper feed mode for sending out sheets of paper from said first paper feed means or a second paper feed mode for sending out sheets of paper from said second paper feed means; and
- control means for enabling operation of said display means during said first paper feed mode and disabling operation of said display means during said second paper feed mode.

7. An image forming apparatus in accordance with claim 6, further comprising:
- means for detecting a quantity of sheets of paper stored in said first paper feed means,
- said display means being also capable of displaying the quantity of sheets in said first paper feed means in response to said detecting means.

8. An image forming apparatus in accordance with claim 6, wherein a quantity of sheets of paper stored in said second paper feed means is visually detectable from outside of said frame box.

9. An image forming apparatus in accordance with claim 6, wherein said second paper feed means is supplied with sheets of paper one by one manually.

10. An image forming apparatus in accordance with claim 6, further comprising:
- means for disabling operation of said display means, overriding said control means.

11. An image forming apparatus comprising:
- image forming means;
- first paper feed means;
- second paper feed means;
- means for detecting a quantity of sheets of paper stored in said first paper feed means;
- display means for displaying the quantity of sheets in said first paper feed means in response to said detecting means;
- means for selecting a first paper feed mode for sending out sheets of paper from said first paper feed means or a second paper feed mode for sending out sheets of paper from said second paper feed means; and
- control means for enabling operation of said display means during said first paper feed mode and disabling operation of said display means during said second paper feed mode.

12. An image forming apparatus comprising:
- image forming means;
- first paper feed means;
- second paper feed means;

display means for displaying a capacity of said first paper feed means;

means for selecting a first paper feed mode for sending out sheets of paper from said first paper feed means or a second paper feed mode for sending out sheets of paper from said second paper feed means; and control means for enabling operation of said display means during said first paper feed mode and disabling operation of said display means during said second paper feed mode.

13. An image forming apparatus comprising:

image forming means;

paper feed means;

means for detecting a quantity of sheets of paper stored in said paper feed means;

display means for displaying the quantity of sheets in said paper feed means in response to said detecting means; and switch means for switching operation and inoperation modes of said display means.

14. An image forming apparatus comprising:

image forming means;

paper feed means;

display means for displaying a capacity of said paper feed means; and switch means for switching operation and inoperation modes of said display means.

15. A paper feeding device used in an image forming apparatus, comprising:

means for storing sheets of paper;

means for sending out sheets of paper one by one from said storing means; and display means for displaying a capacity of the storing means.

16. A paper feeding device in accordance with claim 15, further comprising:

means for detecting a quantity of sheets of paper in said storing means, said display means being capable of displaying the quantity of sheets in said storing means in response to said detecting means.

17. A paper feeding device in accordance with claim 15, wherein said display means comprises a plurality of display elements and specified ones of said display elements corresponding to the capacity of said storing means are activated.

18. A paper feeding device used in an image forming apparatus, comprising:

means for storing sheets of paper;

means for detecting a quantity of sheets of paper in said storing means;

means for sending out sheets of paper one by one from said storing means; and display means including a first display portion for displaying a capacity of said storing means and a second display portion for displaying a quantity of sheets of paper in said storing means in response to said detecting means.

19. A paper feeding device in accordance with claim 18, wherein said second display portion comprises a plurality of display elements arranged at prescribed intervals and a number of display elements proportional to the quantity of sheets of paper are activated.

20. A paper feeding device in accordance with claim 18, wherein said first display portion is provided adjacent to said second display portion and displays a numerical value corresponding to the capacity.

21. An image forming apparatus comprising:

first paper feed means including means for storing sheets of paper, means for sending out sheets of paper one by one from said storing means to said image forming means, means for displaying a capacity of said storing means;

second paper feed means including temporary storing means for temporarily storing the sheets printed by said image forming means, and means for sending out sheets of paper one by one from said temporary storing means to feed again said sheets to said image forming means;

means for selecting either a first paper feed mode for feeding sheets of paper from said first paper feed means to said image forming means or a second paper feed mode for feeding sheets of paper from said second paper feed means to said image forming means; and means for forbidding display of said means for displaying the capacity during said second paper feed mode.

22. An image forming apparatus in accordance with claim 21, wherein the same face of a sheet as the face printed in said first paper feed mode is printed in said second paper feed mode.

23. An image forming apparatus in accordance with claim 21, wherein another face of a sheet different from the face printed in said first paper feed mode is printed in said second paper feed mode.

24. An image forming apparatus comprising:

image forming means;

first paper feed means including means for storing sheets of paper means for detecting a quantity of sheets of paper in said storing means, means for sending out sheets of paper one by one from said storing means to said image forming means, and second paper feed means including temporary storing means for temporarily storing sheets of paper printed by said image forming means, and means for sending out sheets of paper one by one from said temporary storing means to feed again said sheets to said image forming means;

means for selecting either a first paper feed mode for feeding sheets of paper from said first paper feed means to said image forming means or a second paper feed mode for feeding sheets of paper from said second paper feed means to said image forming means; and display means for displaying a quantity of sheets of paper in said storing means in the first paper feed mode in response to said detecting means, and displaying predetermined information in said second paper feed mode irrespective of the quantity of sheets of paper in said storing means.

25. An image forming apparatus in accordance with claim 24, wherein the same face of a sheet as the face printed in said first paper feed mode is printed in said second paper feed mode.

26. An image forming apparatus in accordance with claim 24, wherein another face of a sheet different from the face printed in said first paper feed mode is printed in said second paper feed mode.

* * * * *